US012775539B2

(12) United States Patent
Sayyed et al.

(10) Patent No.: US 12,775,539 B2
(45) Date of Patent: Oct. 27, 2026

(54) PROVIDING VISUAL FEEDBACK DURING A STARTUP RECOVERY PROCESS

(71) Applicant: Dell Products L.P., Round Rock, TX (US)

(72) Inventors: Ibrahim Sayyed, Georgetown, TX (US); Adolfo Sandor Montero, Pflugerville, TX (US); Xiaomei Zhu Miller, Round Rock, TX (US); Venkata Rama Krishna Rao Atta, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/085,763

(22) Filed: Mar. 20, 2025

(65) Prior Publication Data

US 2026/0288612 A1 Sep. 24, 2026

(51) Int. Cl.

| | |
|---|---|
| ***G06F 11/30*** | (2006.01) |
| ***G06F 1/3228*** | (2019.01) |
| ***G06F 11/14*** | (2006.01) |
| ***G06F 11/32*** | (2006.01) |

(52) U.S. Cl.

CPC ........ *G06F 11/328* (2013.01); *G06F 11/1417* (2013.01)

(58) Field of Classification Search

None

See application file for complete search history.

(56) References Cited

U.S. PATENT DOCUMENTS

| | | | | |
|---|---|---|---|---|
| 9,529,602 B1 | 12/2016 | Swierk | | |
| 9,921,915 B2 * | 3/2018 | Hung | .................. | G06F 11/1417 |
| 10,572,366 B1 * | 2/2020 | Raju | .................. | G06F 11/3065 |

(Continued)

FOREIGN PATENT DOCUMENTS

| | | |
|---|---|---|
| CN | 114553672 A | 5/2022 |
| CN | 119105892 A | 12/2024 |

OTHER PUBLICATIONS

"3.3 Solid State Drive (SSD) Sideband Communication". (n.d.) Microchip. Retrieved from <https://onlinedocs.microchip.com/oxy/GUID-0B93C9C3-5EE7-4FF2-B393-A18C25E98146-en-US-4/GUID-4569DC63-C678-4EEC-A190-2BB0A73EC575.html> on Mar. 19, 2025 (2 pages).

(Continued)

*Primary Examiner* — Hyun Nam

(74) *Attorney, Agent, or Firm* — WOMBLE BOND DICKINSON (US) LLP

(57) ABSTRACT

Methods and systems for managing operation of a data processing system are disclosed. To manage the data processing system, a management controller of the data processing system may initiate performance of a startup data recovery process based on an occurrence of an undesired startup event for the data processing system. While the startup data recovery process is performed, the management controller may initiate operation of a visual display system using a side band channel to provide visual feedback to a user of the data processing system regarding a status of the startup data recovery process and/or an operational state of the data processing system. To provide its functionality, the management controller may be placed in a diagnostic operating state using startup data stored on storage resources of the management controller.

20 Claims, 8 Drawing Sheets

(56) References Cited

U.S. PATENT DOCUMENTS

| | | | | |
|---|---|---|---|---|
| 10,853,204 | B2 | 12/2020 | Bisa et al. | |
| 11,340,990 | B2 | 5/2022 | Hsu et al. | |
| 11,550,664 | B2 * | 1/2023 | Luong | G06F 11/3476 |
| 12,282,391 | B2 * | 4/2025 | Vishwanath | G06F 11/2012 |
| 12,455,788 | B1 * | 10/2025 | Ramaiah | G06F 11/1417 |
| 12,498,912 | B1 | 12/2025 | Sundararaman | |
| 2007/0174689 | A1 | 7/2007 | Chen | |
| 2007/0226328 | A1 | 9/2007 | Kusama | |
| 2009/0271602 | A1 * | 10/2009 | Burks, III | H04L 12/6418 713/2 |
| 2016/0070625 | A1 * | 3/2016 | Allu | G06F 11/1417 714/4.11 |
| 2016/0117176 | A1 * | 4/2016 | Gillon | G06F 9/4403 713/2 |
| 2017/0207964 | A1 | 7/2017 | Ragupathi | |
| 2018/0074884 | A1 | 3/2018 | Cady | |
| 2018/0336086 | A1 | 11/2018 | Vaden | |
| 2020/0252434 | A1 * | 8/2020 | Akkawi | G06F 21/575 |
| 2021/0240567 | A1 | 8/2021 | Hsu | |
| 2021/0286692 | A1 | 9/2021 | Chien | |
| 2021/0349729 | A1 * | 11/2021 | Zlotnick | G06F 9/45558 |
| 2022/0216916 | A1 | 7/2022 | Compann | |
| 2022/0229482 | A1 | 7/2022 | Ba | |
| 2022/0261322 | A1 | 8/2022 | Narasimhamurthy et al. | |
| 2023/0025750 | A1 | 1/2023 | Teoh | |
| 2024/0045765 | A1 | 2/2024 | Kim | |
| 2024/0419552 | A1 | 12/2024 | Poosapalli | |
| 2025/0044985 | A1 * | 2/2025 | Montero | G06F 1/206 |
| 2025/0068521 | A1 | 2/2025 | Choi | |
| 2025/0068530 | A1 | 2/2025 | Montero | |
| 2026/0030085 | A1 | 1/2026 | Kotary | |
| 2026/0111315 | A1 | 4/2026 | Curtin | |
| 2026/0143028 | A1 * | 5/2026 | Nebel | H04L 67/1095 |

OTHER PUBLICATIONS

Ham et al., “Low-overhead General-purpose Near-Data Processing in CXL Memory Expanders”, arXiv:2404.19381v1, Apr. 30, 2024, retrieved from <https://arxiv.org/html/2404.19381v1> on Mar. 19, 2025 (16 pages).

Debendra Das Sharma and Thomas Coughlin, “Universal Chiplet Interconnect Express: An Open Industry Standard for Memory and Storage Applications”, Computer. IEEE Computer Society, Jan. 2024, pp. 75-81, vol. 57, DOI: 10.1109/MC.2023.3318769. Retrieved from <https://www.computer.org/csdl/magazine/co/2024/01/10380290/1TpyLNc6Z7G> on Mar. 19, 2025 (7 pages).

“About Stolen Device Protection for iPhone”. Apple Support. Dec. 11, 2024. Retrieved from <https://support.apple.com/en-us/120340> on Mar. 19, 2025 (3 pages).

* cited by examiner

PROVIDING VISUAL FEEDBACK DURING A STARTUP RECOVERY PROCESS

FIELD

Embodiments disclosed herein relate generally to managing operation of a data processing system. More particularly, embodiments disclosed herein relate to managing operation of the data processing system by providing visual feedback during a startup data recovery process based on an occurrence of an undesired startup event.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
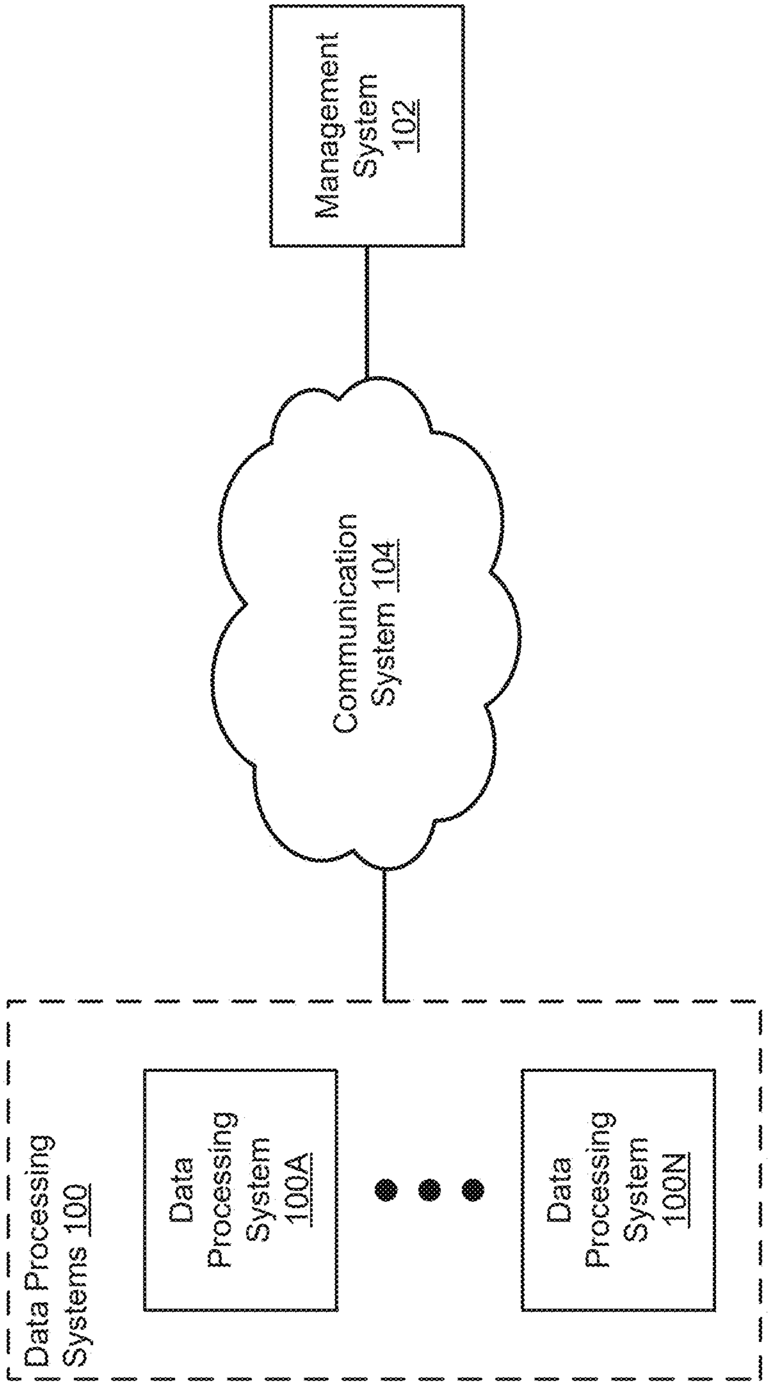
FIGS. 1A-1C show diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of a data processing system. The data processing systems may provide computer-implemented services to any type and number of other devices and/or users of the data processing systems. The computer-implemented services may include any quantity and type of such services.

To provide the computer-implemented services, a data processing system may perform a booting process (e.g., a startup process) to initialize operation of hardware resources hosted by the data processing system. To do so, a processor (e.g., a central programming unit (CPU)) of the hardware resources may utilize startup data (e.g., basic input/output system (BIOS) firmware, system configuration files, etc.) that may be stored on a boot storage device. The boot storage device may include, for example, a non-volatile memory storage device (e.g., serial peripheral interface flash).

An undesired startup event may occur when the processor is unable to perform the booting process using the startup data stored on the boot storage device. For example, the processor may be unable to perform the booting process when at least one copy of the startup data hosted by the boot storage device includes erroneous data (e.g., corrupted firmware, malicious data, incompatible firmware version, etc.), a firmware image is improperly flashed on the boot storage device, and/or any other causes impacting an ability of the processor to perform the booting process. Consequently, the at least a portion of the hardware resources may be inoperable.

To modify operation of the data processing system in an event of compromise and/or reduced functionality of at least a portion of the hardware resources, the data processing system may host a management controller that may operate independently from the hardware resources and may be distinct from and adapted to manage the hardware resources. For example, the management controller may operate during the booting process and/or regardless of an outcome of the booting process performed by booting components (e.g., the boot storage device and/or the processor) of the hardware resources.

Furthermore, the management controller may host second startup data (e.g., an original equipment manufacturer (OEM) version of a bootloader) usable to place the management controller in a default operating state. The second startup data may be used, for example, in an instance of a startup process where first startup data hosted by the boot storage device is not loaded for the management controller to perform its functionality. The management controller may subsequently initiate a new booting using the second startup data so that the management controller may be placed, for example, in a diagnostic state used to diagnose operation of the hardware resources.

By doing so, the management controller may identify the undesired startup event during the booting of the data processing system where the processor attempts to boot the data processing system using the startup data stored on the boot storage device (e.g., while the management controller operates in the diagnostic state). When identified, the management controller may initiate performance of a startup data recovery process. The startup data recovery process may include, for example, obtaining a backup copy of startup data from a boot partition of a storage device using a side band channel, replacing the startup data on the boot storage device with the backup copy of the startup data, initiating a rebooting process by the processor, and/or performing any other actions.

However, a status of an operational state of the data processing system may not be provided to a user of the data processing system relevant to the undesired startup event. For example, in-band components of the data processing system (e.g., a visual display system) may not be in a desired operating state to inform the user of the operational state (e.g., a status of the startup data recovery process) of the data processing system. Consequently, an opacity of the startup data recovery process with respect to the user may prevent the data processing system from being placed in the desired operating state due to undesired user action (e.g., power cycling the data processing system).

Thus, to improve a likelihood that the data processing system may be placed in the desired operating state, the management controller may initiate operation of the visual display system using a side band channel to provide visual feedback to the user while the startup data recovery process is performed. For example, the management controller may power on the visual display system, obtain predefined messages regarding a status of the startup data recovery process, provide the predefined messages to the visual display channel using the side band channel, and/or perform any other actions. The visual display system may subsequently display the predefined messages to the user that may facilitate desired user action (e.g., waiting, contacting support, etc.).

Thus, embodiments disclosed herein may provide an improved method for managing operation of a data processing system by using a management controller to provide visual feedback during a startup data recovery process. By doing so, the data processing system may be more likely to be placed in a desired operating state to provide desired computer-implemented services.

In an embodiment, a method for managing operation of a data processing system is provided. The method may include: (i) identifying, by a management controller of the data processing system, an occurrence of an undesired startup event during a booting of the data processing system using first startup data in a boot storage device of hardware resources of the data processing system; (ii) based on the identifying: (a) initiating, by the management controller, performance of a startup data recovery process to place the data processing system in a desired operating state; (b) while the startup data recovery process is performed: (i) initiating, by the management controller, operation of a visual display system using a side band channel to provide visual feedback to a user of the data processing system regarding a status of the startup data recovery process; and (c) providing, by the data processing system and while in the desired operating state, computer-implemented services.

The method may also include: prior to identifying the occurrence of the undesired startup event: (i) identifying, by the management controller, an occurrence of a second undesired startup event during a second booting of the data processing system using third startup data in the boot storage device, the third startup data used to boot the management controller; and (ii) based on the identifying: (a) initiating, by the management controller, a new booting using fourth startup data hosted by storage resources of the management controller to place the management controller in a default operating state.

The default operating state may be a diagnostic state used in diagnosing operation of hardware components of the hardware resources during identifying of the occurrence of the undesired startup event.

Identifying the occurrence of the undesired startup event may include: (i) obtaining, by the management controller and via a second side band channel, information from a processor of the hardware resources while the processor attempts to boot the data processing system, the information indicating that the undesired startup event has occurred.

Performing the startup recovery process may include: (i) obtaining, by the management controller and via a second side band channel, second startup data from a boot partition of a storage device hosted by the hardware resources; (ii) replacing, by the management controller and via a third side band channel, the first startup data with the second startup data; and (iii) initiating, by the management controller, a rebooting process by a processor of the hardware resources using the second startup data hosted by the boot storage device.

The visual display system may be unusable by the processor until completion of the booting.

The visual display system may include: (i) a timing controller; and (ii) a display panel.

The visual feedback may include predefined messages adapted to direct user action to facilitate placing the data processing system in the desired operating state.

The predefined messages may be: (i) stored on a boot partition of a storage device hosted by the hardware resources, and (ii) obtained, by the management controller, from the boot partition using a second side band channel.

The predefined messages may be stored on storage resources of the management controller.

The visual feedback may inform the user regarding changes in an operational state of the data processing system while in-band components of the data processing system are unable to inform the user due, at least in part, to inaccessibility of the first startup data.

The management controller may operate independently from and is distinct from the hardware resources.

The management controller is on a separate power domain from the hardware resources so that the management controller is operable while the hardware resources are inoperable.

In an embodiment, a non-transitory media is provided. The non-transitory media may include instructions that when executed by a processor cause the computer-implemented method to be performed.

In an embodiment, a system is provided. The system may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services (e.g., to user of the system and/or devices operably connected to the system).

Figure 1B:
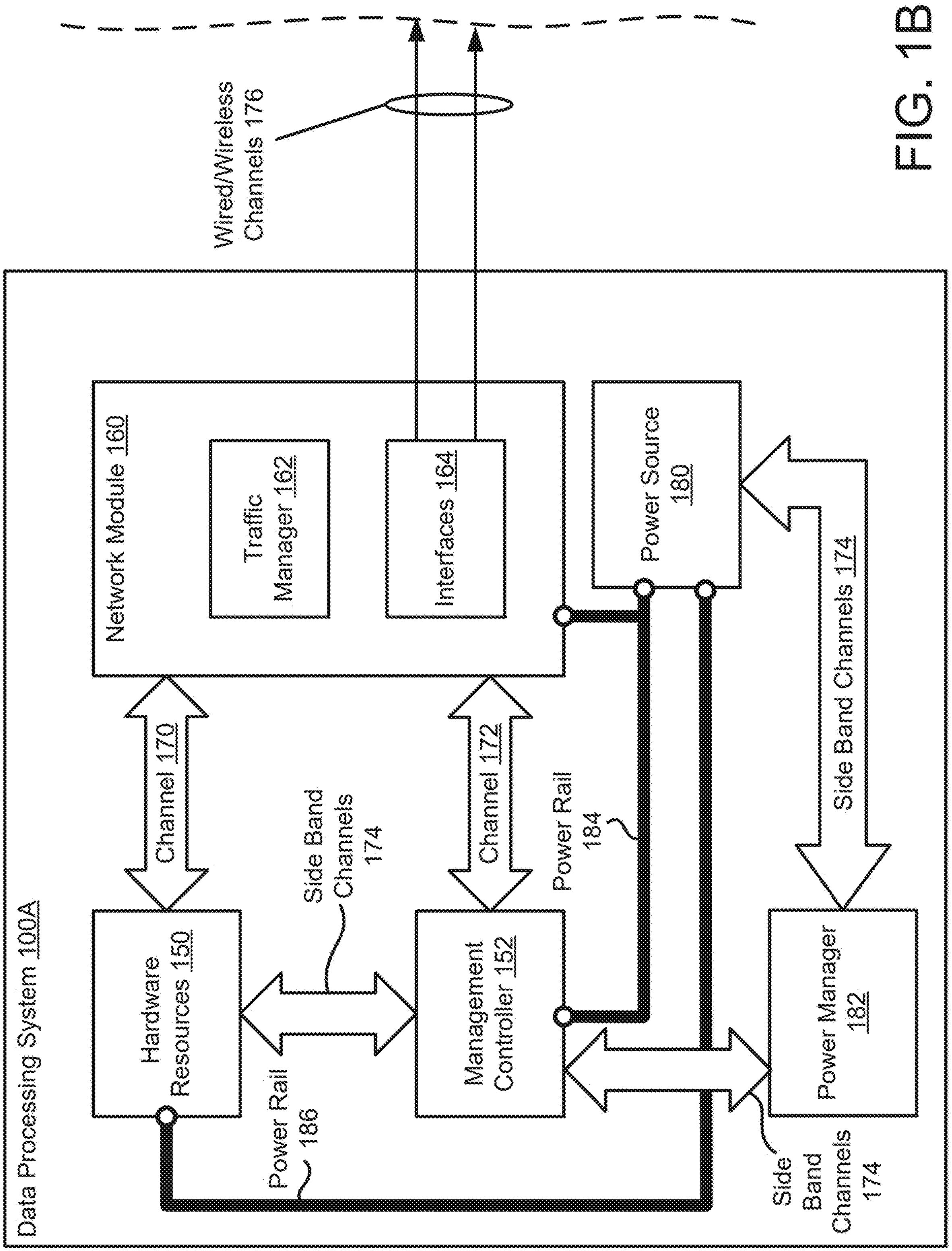

The system may include any number of data processing systems 100 (e.g., computing devices) that may each include any number of hardware components (e.g., processors, memory modules, storage devices, communication devices, etc.). The hardware components may support execution of any number and types of applications (e.g., software components). Changes in available functionalities of the hardware and/or software components may provide for various types of different computer-implemented services to be provided over time. Refer to FIG. 1B for additional details regarding data processing systems 100.

The computer-implemented services may include any type and quantity of computer-implemented services. The computer-implemented services may include, for example, database services, data processing services, electronic communication services, and/or any other services that may be provided using one or more computing devices. The computer-implemented services may be provided by, for example, data processing systems 100, management system 102, and/or any other type of devices (not shown in FIG. 1A). Other types of computer-implemented services may be provided by the system shown in FIG. 1A without departing from embodiments disclosed herein.

The computer-implemented services may be provided at least in part, by hardware resources of data processing systems 100. To provide the computer-implemented services, a data processing system may perform a startup process (e.g., booting) to initialize operation of the hardware resources. To do so, a processor (e.g., a central programming unit (CPU)) of the hardware resources may utilize boot data (e.g., basic input/output system (BIOS) firmware, system configuration files, etc.) that may be stored on a boot storage device. The boot storage device may include, for example, a non-volatile memory storage device (e.g., serial peripheral interface flash). By performing the booting process, the hardware resources of the data processing system may be operably connected to each other (e.g., via in-band channels) and an operating system may be loaded to provide management functionality.

An undesired startup event may occur when the processor is unable to boot the data processing system using startup data stored on the boot storage device. For example, the processor may be unable to boot the data processing system when at least one copy of the boot data hosted by the boot storage device includes erroneous data (e.g., corrupted firmware, malicious data, incompatible firmware version, etc.), a firmware image is improperly flashed on the boot storage device, and/or any other causes impacting an ability of the processor to perform the booting process. Consequently, the at least a portion of the hardware resources may be inoperable.

To modify operation of the data processing system in an event of compromise and/or reduced functionality of at least a portion of the hardware resources, the data processing system may host a management controller that may operate independently from the hardware resources and may be distinct from and adapted to manage the hardware resources. As such, the management controller may operate during the booting process and/or regardless of an outcome of the booting process performed by booting components (e.g., the boot storage device and/or the processor) of the hardware resources.

The management controller may identify the occurrence of the undesired startup event, as previously mentioned, by obtaining information from the processor using a side band channel. Based on the undesired startup event, the management controller may initiate a startup data recovery process. The startup data recovery process may include, for example, obtaining second startup data (e.g., backup data, a latest stable copy of startup data, etc.) from a storage device hosted by the data processing system, replacing the first boot data stored on the boot storage device with the second startup data, initiating a rebooting of the data processing system using the second startup data, and/or any other processes.

The storage device may include a non-volatile memory (NVMe) storage device that may include a boot partition (e.g., a section of the storage device allocated to store data relevant to the booting process). The management controller may provide and/or obtain (e.g., read and/or write) data from the boot partition using a second side band communication channel to perform the startup data recovery process.

However, a status of an operational state of the data processing system may not be provided to a user of the data processing system relevant to the undesired startup event (e.g., during performance of the startup data recovery process). For example, in-band components of the data processing system (e.g., a visual display system) may not be usable by the processor to inform the user of the operational state (e.g., a status of the startup data recovery process) of the data processing system. Consequently, an opacity of the startup data recovery process with respect to the user may prevent the data processing system from being placed in the desired operating state (e.g. at least in a timely manner) due to undesired user action (e.g., power cycling the data processing system, disrupting the startup data recovery process, etc.).

In general, embodiments disclosed herein relate to systems, devices, and methods for managing operation of a data processing system. To manage the operation of a data processing system, the management controller may initiate operation of the visual display system using a side band channel to provide visual feedback to the user while the startup data recovery process is performed. The visual feedback may inform the user regarding changes in an operational state of the data processing system and/or direct user action to facilitate placing the data processing system in the desired operating state (e.g., waiting, contacting support, etc.).

For example, because the in-band components are unable to inform the user (e.g., due to an inability of the processor to interact with at least a portion of the hardware resources with respect during booting), the management controller may utilize a side band channel to power on the visual display system, obtain predefined messages regarding a status of the startup data recovery process, provide the predefined messages to the visual display channel using the side band channel, and/or perform any other actions.

The predefined messages may include, for example, messages (e.g., text, images, etc.) regarding a status of the startup data recovery process (e.g., “Retrieving and verifying the recovery image”, “Restoring firmware image”, “No valid recovery image found”, etc.), messages regarding an operational state of the data processing system (e.g., “System is recovering”, “Recovery complete”, “System is restarting”, etc.), messages to direct user action (e.g., “Do not power off system”, “Contact technical support”, “Contact manufacturer vendor”, etc.).

The predefined messages may be stored, for example, on the boot partition of the storage device and retrieved by the management controller using a side band channel between the storage device and the management controller. The predefined messages may also be stored on storage resources of the management controller. Once obtained, the predefined messages may be used to initiate operation of the visual display system to provide the visual feedback to the user. For example, the predefined messages may be processed by the management controller to obtain processed data (e.g., rendered text/images, framebuffer formatted data, etc.), the processed data may be transmitted to a controller (e.g., a timing controller) of the visual display system, and the predefined messages may be displayed on a display panel of the visual display system.

To provide its functionality, the management controller may, via a second booting process (e.g., that may be prior to and/or during the first booting of the data processing system), load an image of a management entity (e.g., a version of firmware for the management controller, an updated configuration for the management controller, etc.) that may be stored on the boot storage device. However, a second undesired startup event (e.g., that may be similar to the first undesired startup event related to undesired startup data of the boot storage device) may prevent the management controller from being placed in a desired operating state.

To improve a likelihood that the management controller may be placed in the desired operating state, the management controller may host second startup data (e.g., an original equipment manufacturer (OEM) version of a bootloader) usable to place the management controller in a default operating state. The second startup data may be used, for example, in an instance of a startup process where first startup data hosted by the boot storage device is not loaded for the management controller to perform its functionality. The management controller may subsequently initiate a new booting using the second startup data so that the management controller may be placed, for example, in a diagnostic state used to diagnose operation of the hardware resources.

By doing so, the management controller may, as previously discussed, identify the first undesired startup event during the booting of the data processing system where the processor attempts to boot the data processing system using the startup data stored on the boot storage device (e.g., while the management controller operates in the diagnostic state). The management controller may subsequently provide its management functionality, for example, by performing the startup data recovery process, initiating operation of the visual display system to provide visual feedback, and/or perform any other actions to place the data processing system in the desired operating state for providing computer-implemented services.

To provide the above noted functionality, the system may include data processing systems 100, and management system 102. Each of these components is discussed below.

Data processing systems 100 may include any number of data processing systems (e.g., 100A-100N) that may individually and/or cooperatively provide at least a portion of the computer-implemented services. Any of data processing systems 100 may include in-band components (e.g., hardware resources), out-of-band components (e.g., management controller, network modules, etc.), and functionality that may allow the out-of-band components to communicate with management system 102 via an out-of-band communication channel.

While providing the at least a portion of the computer-implemented services, a data processing system (e.g., 100A) of data processing systems 100 may communicate with and/or obtain information from management system 102. For example, data processing system 100A may obtain instructions relevant to updated storage device software (e.g., an updated firmware version), implementing a startup data recovery policy, management requests to modify operation of the hardware resources (e.g., installing new applications), and/or any other information. Data processing system 100A may subsequently perform actions based on the information obtained from management system 102 to update operation of data processing system 100A.

Management system 102 may, as discussed above, provide remote management services. Management system 102 may include, for example, a second data processing system operated an owner of data processing systems 100. To provide the remote management services, management system 102 may interact with data processing systems 100 to obtain and/or provide information (e.g., data) relevant to operation of data processing systems 100. For example, management system 102 may generate and provide a data recovery policy to a data processing system of data processing systems 100, evaluate data regarding operation of the data processing system, provide at least a portion of predefined messages related to a startup data recovery process and/or operational states of the data processing system, and/or provide any other services to manage operation of data processing systems 100.

While providing their functionality, any of data processing systems 100, and management system 102 may provide all or a portion of the methods shown in FIGS. 2A-3B.

Communication system 104 may allow any of data processing systems 100, and management system 102 to communicate with one another (and/or with other devices not illustrated in FIG. 1A). To provide its functionality, communication system 104 may be implemented with one or more wired and/or wireless networks. Any of these networks may be a radio access network (e.g., a cellular core network), a private network (e.g., the "Network" shown in FIG. 4), a public network, and/or may include the Internet. For example, data processing systems 100 may be operably connected to management system 102 via the Internet. Data processing systems 100, management system 102, and/or communication system 104 may be adapted to perform one or more protocols for communicating via communication system 104.

Any of (and/or components thereof) data processing systems 100, and management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Thus, as shown in FIG. 1A, a system in accordance with an embodiment may manage operation of a data processing system by using a management controller to initiate operation of a visual display system to provide visual feedback regarding an operational status of the data processing system while a startup data recovery process is performed. By doing so, a likelihood that the startup data recovery process may be completed (e.g., in a timely manner, without disruption, etc.) to place the data processing system in a desired operating state may be improved.

While illustrated in FIG. 1A with a limited number of specific components, a system may include additional, fewer, and/or different components without departing from embodiments disclosed herein.

Turning to FIG. 1B, a diagram illustrating a data processing system in accordance with an embodiment is shown. Data processing system 100A shown in FIG. 1B may be similar to any of the data processing systems shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components.

The storage may include any number and/or types of storage devices (e.g., hard drives, solid state drives, etc.). A storage device of the storage devices may include, for example, memory (e.g., non-volatile memory), a controller that may manage data operations (e.g., storage, retrieval, organization, etc.), and/or other physical components. The storage device may support storage protocols (e.g., non-volatile memory express) that may facilitate use of storage resources of the storage device.

For example, the storage may include a first storage device adapted to host an image of a startup management entity (e.g., basic input/output system (BIOS)), system configurations, and/or any other information. Additionally, the storage may include a second storage device that may include, but not be limited to, storage for information necessary to boot the data processing system, load an operating system for the data processing system, and/or perform any other processes.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing hardware resources 150 to communicate with other devices via packet switched networks and/or other types of communication networks.

The processor may also host various applications that provide the computer-implemented services. The applications may utilize various services provided by the management entities and use (at least indirectly) the network stack to communication with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

To reduce the likelihood of the applications and/or other in-band entities from being indirectly compromised, data processing system 140 may include management controller 152 and network module 160. Each of these components of data processing system 140 is discussed below.

Management controller 152 may be implemented, for example, using a system on a chip or other type of independently operating computing device (e.g., independent from the in-band components, such as hardware resources 150, of a host data processing system 100A). Management controller 152 may provide various management functionalities for data processing system 100A. For example, management controller 152 may monitor various ongoing processes performed by the in-band components, may manage power distribution, thermal management, and/or other functions of data processing system 100A.

To provide the management functionalities, management controller 152 may utilize data that may, at least temporarily be stored on storage resources hosted by management controller 152. For example, management controller 152 may download an image of a new management entity (e.g., firmware, application, etc.) in response to a management request, store the image, and install the new management entity using at least the image on hardware resources 150. Additionally, management controller 152 may interact with a visual display system to provide visual feedback to a user regarding an operational state of data processing system 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, management controller 152 may identify an occurrence of an undesired startup event for a processor attempting to boot data processing system 100A, perform a startup data recovery process based on the undesired startup event, initiate operation of the visual display to provide visual feedback regarding a status of the startup data recovery process, and/or perform any other management functionalities using side band channels 174.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

For example, storage devices of hardware resources 150 may not be operably connected to a processor (e.g., due to in-band channels between the processor and the storage devices not being functional during the booting process). Management controller 152 may communicate with the processor, the boot storage device, storage device, and the visual display system via side band channels 174. By doing so, management controller 152 may obtain and perform management functionalities (e.g., detecting a system hang during booting, obtaining data from a storage device, restoring startup data on the boot storage device, transmitting signals to the visual display system, etc.) regardless of an operating state of hardware resources 150.

To facilitate communication with other devices, data processing system 100A may include network module 160. Network module 160 may provide communication services for in-band components and out-of-band components (e.g., management controller 152) of data processing system. To do so, network module 160 may include traffic manager 162 and interfaces 164.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

Therefore, management controller 152 may communicate the telemetry data regarding operation of the storage device to management system 102, obtain a remediation package from management system 102, and/or cooperatively perform any other management functionalities via communication of information using an out-of-band communication channel (e.g., channel 172).

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails. Management controller 152 may cooperate with power manager 182 to manage supply of power to these power domains.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations illustrated in FIGS. 2A-3B.

While illustrated in FIG. 1B with a limited number of specific components, a system may include additional, fewer, and/or different components without departing from embodiments disclosed herein.

Figure 1C:
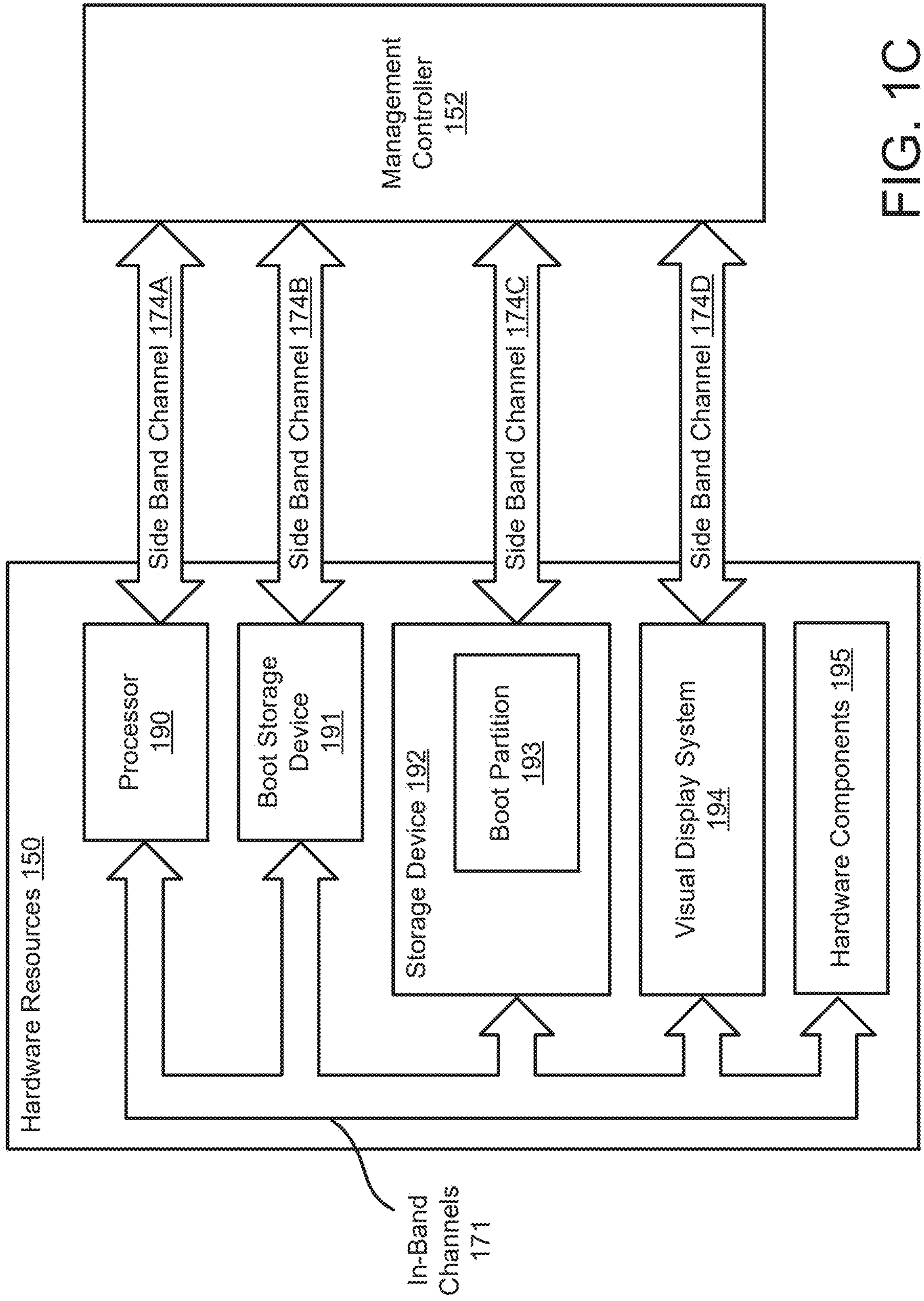

Turning to FIG. 1C, to provide computer-implemented services, hardware resources 150 may host processor 190, boot storage device 191, and storage device 192. For example, to place a data processing system (e.g., 100A) in a desired operating state, data processing system 100A may perform a booting process to initialize hardware resources and facilitate operation of an operating system. To do so, processor 190 may execute instructions indicated by startup data (e.g., firmware, system configuration, etc.) hosted by boot storage device 191.

Boot storage device 191 may include, for example, non-volatile flash memory (e.g., serial peripheral interface (SPI) flash) that may be hosted on a motherboard and adapted to store information, such as firmware, an image of a management entity (BIOS, unified extensible firmware interface (UEFI), etc.), system configuration files, and/or any other information usable to startup data processing system 100A. Because boot storage device 191 may have a limited storage capacity, storage device 192 may be used to store additional information (e.g., other copies of startup data).

Storage device 192 may include, for example, a second storage device such as a non-volatile memory express (NVMe) based solid-state drive. Storage device 192 may include a boot partition (193) that may be configured to store data usable to startup data processing system 100A (e.g., a desired of startup data, bootloader files, configuration files, etc.). Boot partition 193 may include an allocated section of storage device 192 that may, for example, be isolated from other memory sections of storage device 192. Furthermore, to provide its functionality, storage device 192 may include storage resources (e.g., flash memory cells), a controller (e.g., to manage operations of the storage device), an interface (e.g., to facilitate communication between the storage device and the processor), and/or any other components.

While operating, storage device 192 may generate data (e.g., telemetry data) regarding operation of storage device 192. The telemetry data may include, for example, error logs, storage device health data, performance metrics, and/or any other information. The telemetry data may be used to manage operation of the storage device 192 and/or other components of data processing system.

Processor 190 may include a central processing unit (CPU) that may interact with any number and/or type of other hardware components (e.g., boot storage device 191, storage device 192, and hardware components 195). For example, when data processing system 100A is powered on, processor 190 may be initialized to a predetermined state and directed to retrieve instructions (e.g., via a reset vector) from boot storage device 191. To interact with boot storage device 191, storage device 192, and/or the other hardware components, processor 190 may be operably connected to each of the components via in-band channels 171.

However, at least a portion of in-band channels 171 may not be functional and/or may have reduced functionality during booting of data processing system 100A and/or as a result of an undesired startup event that may prevent completion of the booting. For example, in an event that storage device 192, visual display system 194, and/or hardware components 195 are not initialized during booting, processor 190 may not be able to communicate with visual display system 194 to provide visual feedback to a user of data processing system 100A. Consequently, the user may be unaware of an operational status of data processing system 100A and may perform actions (e.g., power cycling, powering off, etc.) that may prevent data processing system 100A from being placed in the desired operating state (e.g., at least in a timely manner).

Thus, to improve a likelihood that data processing system 100A may be booted and placed in the desired operating state, management controller 152 may perform management functionalities using any number and/or type of side band channels (e.g. 174). For example, management controller may obtain information (e.g., telemetry data, process results, boot times, etc.) regarding operation of storage device 192 from processor 190 using side band channel 174A, replace a copy of undesired startup data hosted by boot storage device 191 with a desired copy of startup data using side band channel 174B, initiate operation of visual display system 194 to provide visual feedback to the user, and/or perform any other actions by communicating with components of hardware resources regardless of an operating status of hardware resources 150.

Visual display system 194 may include, for example, a timing controller, a display panel, drivers, and/or any other components. For example, a timing controller of visual display system 194 may receive data (e.g., video signals, messages, formatted data, etc.) from processor 190 using in-band channels 171, generate display signals (e.g., timing signals, pixel data, etc.), distribute the display signals to a driver of the display panel, and/or perform any other actions. The display panel may subsequently display the information (e.g., by activating pixels based on the display signals) to provide visual feedback to the user.

Figure 2A:
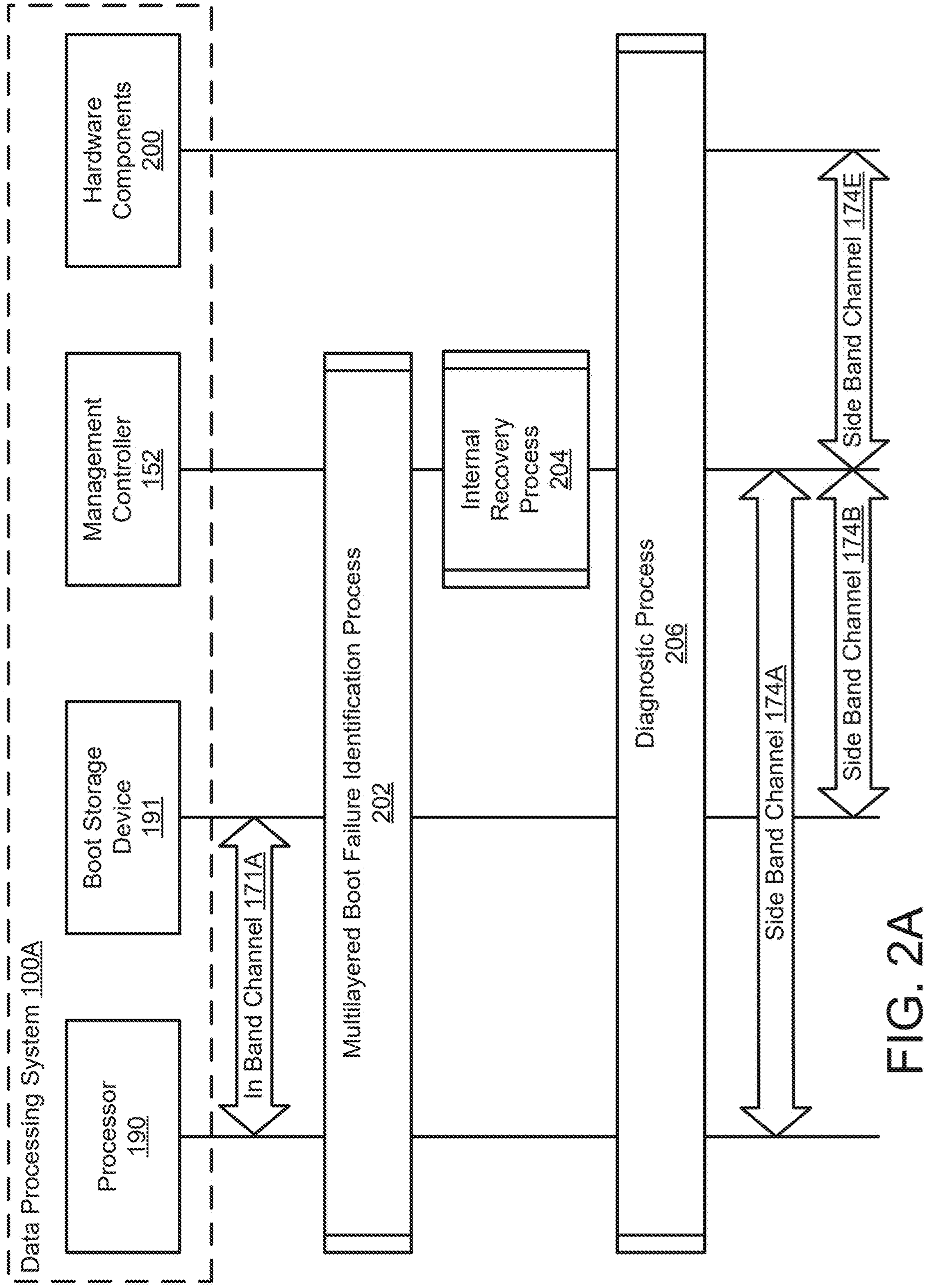
FIGS. 2A-2B show interaction diagrams in accordance with an embodiment.
Figure 2B:
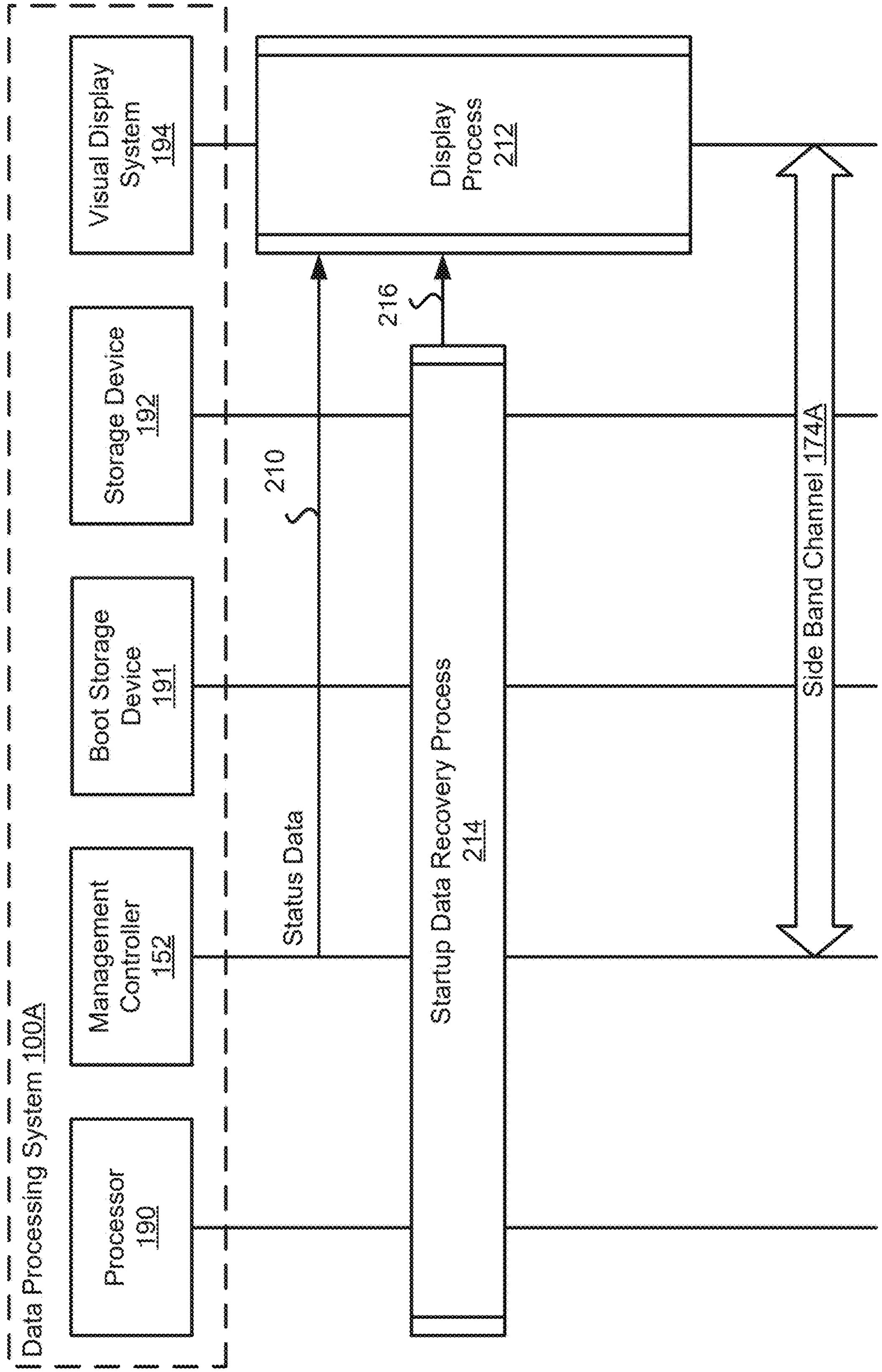

To further clarify embodiments disclosed herein, interaction diagrams in accordance with an embodiment are shown in FIGS. 2A-2B. The interaction diagrams may illustrate how data may be obtained and used within the system of FIGS. 1A-1C.

In the interaction diagrams, processes performed by and interactions between components of a system in accordance with an embodiment are shown. In the diagrams, components of the system are illustrated using a first set of shapes (e.g., 190, 191, etc.), located towards the top of each figure. Lines descend from these shapes. Processes performed by the components of the system are illustrated using a second set of shapes (e.g., 202, 204, etc.) superimposed over these lines. Interactions (e.g., communication, data transmissions, etc.) between the components of the system are illustrated using a third set of shapes (e.g., 210, 216, etc.) that extend between the lines. The third set of shapes may include lines terminating in one or two arrows. Lines terminating in a single arrow may indicate that one way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 210 may occur prior to the process labeled as 214. However, it will be appreciated that the processes and interactions may be performed in different orders, any may be omitted, and other processes or interactions may be performed without departing from embodiments disclosed herein.

Turning to FIG. 2A, a first interaction diagram in accordance with an embodiment is shown. The first interaction diagram may illustrate processes and interactions that may occur to place a management controller of a data processing system in a default operating state in an instance of an undesired startup event for the management controller.

To identify an occurrence of the undesired startup event, multilayered boot failure identification process 202 may be performed. During multilayered boot failure identification process 202, management controller 152 may attempt to boot using startup data hosted by boot storage device 191, and processor 190 may attempt to boot data processing system 100A using second startup data hosted by boot storage device 191. For example, to boot management controller 152, management controller 152 execute instructions defined by a hardcoded firmware load policy (e.g., that may point to boot device 191), attempt to retrieve the startup data from boot device 191, attempt to load the startup data to memory of management controller 152, and/or perform any other actions. Management controller 152 may identify an occurrence of an undesired startup event related to a failure to load the startup data for management controller 152. The failure may, for example, be due to a corrupted copy of a bootloader hosted by boot storage device 191, inaccessibility of boot storage device 191 (e.g., connection issues, drive failure, outdated driver, etc.), and/or any other conditions.

Processor 190 may attempt to boot data processing system 100A using second startup data (e.g., BIOS, UEFI, etc.) concurrently and/or following booting of management controller 152 using the first startup data hosted by boot storage device 191. In a first instance of the booting where management controller 152 is unable to boot using the first startup data, as previously discussed, management controller 152 may be placed in a default operating state (e.g., prior to providing management functionalities while processor 190 attempts to boot data processing system 100A).

To place the management controller in the default operating state, internal recovery process 204 may be performed. During internal recovery process 204, a control path may be modified for management controller 152 to boot using default startup data. The default startup data may include, for example, an OEM bootloader configured by a manufacturer of management controller 152 and stored on storage resources (e.g., secured flash memory) of management controller 152. The control path may be modified, for example, by triggering a reset vector for management controller when the boot failure for management controller 152 is identified. By doing so, management controller 152 may initiate a new booting to load the default startup data from the storage resources of management controller 152 to memory of management controller 152. Management controller 152 may subsequently execute instructions indicated by the default startup data to place management controller 152 in a default operating state. The default operating state may be defined to be a diagnostic state used in diagnosing operation of hardware components 200.

Hardware components 200 may include, for example, storage devices (e.g., storage device 192), power supply, system memory, visual display system 194, input devices, and/or any other components (e.g., 195). Each hardware component of hardware components 200 may require initialization (e.g., detected, configured, etc.) to be operably connected to processor 190 to provide its respective functionality. However, hardware components 200 may not be in a desired operating state during the startup and/or in an occurrence of an undesired startup event.

To diagnose operation of hardware components 200 during a startup of the data processing system, diagnostic process 206 may be performed. During diagnostic process 206, management controller 152 may monitor a startup of data processing system 100A to identify an occurrence of an undesired startup event relevant to operation of hardware components 200. To do so, management controller 152 may monitor and/or obtain information from processor 190 using side band channel 174A. For example, management controller 152 may obtain data (e.g., telemetry data) from processor 190, compare the data to criteria (e.g., a startup timeout time), and determine that an undesired startup event (e.g., a system hang) has occurred. Based on the identification that the undesired startup event has occurred, management controller 152 may initiate performance of and/or provide feedback regarding a boot data recovery process. Refer to FIG. 2B for additional details regarding providing visual feedback regarding the boot data recovery process.

While attempting to boot, processor 190 may be operably connected to boot storage device 191 via in-band channel 171A but may not operably connected to hardware components 200. In-band channel 171A may include, for example, a limited communication channel between processor 190 and boot storage device 191 that may be facilitated using a signal multiplexer that may enable processor 190 to communicate with boot storage device 191 (e.g., using a system bus) while limiting communication with the other hardware components prior to a management entity (e.g., an operating system, drivers, etc.) being loaded as a result of a successful booting.

Side band channels (e.g., 174A, 174B, 174E) may be used to facilitate communication between management controller 152 and hardware resources, and are shown to indicate that management controller 152 may interface with processor 190, storage device 191, and hardware components 200 regardless of a status of in-band channels (e.g., that may have reduced functionality due to the undesired startup event). Using the side band channels, management controller 152 may perform management commands that may include, for example, obtaining information that may be used to identify an undesired startup attempt, diagnosing operation of hardware components during a startup of data processing system 100A, and/or performing any other actions.

Thus, using processes and interactions shown in FIG. 2A, a management controller of a data processing system may be placed in a diagnostic operating state using default startup data hosted by storage resources of the management controller. While in the diagnostic operating state, the management controller may monitor operation of hardware components of the data processing system during a startup of the data processing system to identify potential undesired startup events related to the hardware components.

Turning to FIG. 2B, a second interaction diagram in accordance with an embodiment is shown. The second interaction diagram may illustrate processes and interactions that may occur during providing of visual feedback to a user of the data processing system while a startup data recovery process is performed.

At interaction 210, status data may be provided to visual display system 194 by management controller 152. The status data may include, for example, a predefined message (e.g., a text string, code, etc.) mapped to an initiation of the startup data recovery process. The status data may be obtained by management controller 152 from storage resources of management controller 152, a boot partition of storage device 192 via a side band channel (not shown), and/or any other storage. The status data may be provided to visual display system by: (i) processing encoded data to obtain displayable data (e.g., pixel data), (ii) sending rendering commands to a graphics processing unit via a side band channel for subsequent processing and transmission to visual display system 194, (iii) transmitting the status data via side band channel 174A (e.g., utilizing a display interface) to a timing controller of visual display system 194, and/or via any other processes. By doing so, the status data may be used to provide visual feedback to a user of data processing system 100A.

To provide the visual feedback to the user, display process 212 may be performed. During display process 212, information regarding a status of startup data recovery process 214 and/or an operational state of data processing system 100A may be displayed on a display panel of visual display system 194. For example, to display the information, a timing controller of visual display system 194 may receive input signals (e.g., any number and/or type of data from management controller 152 regarding the status), generate display signals (e.g., timing signals, pixel data, etc.), distribute the display signals to a driver of the display panel, and/or perform any other actions. The display panel may subsequently display the information (e.g., by activating pixels based on the display signals) to inform/update the user of the status of startup data recovery process 214 and/or an operational state of data processing system 100A.

To place data processing system 100A in a desired operating state with respect to startup data hosted by storage device 192, startup data recovery process 214 may be performed. During startup data recovery process 214, backup startup data may be obtained from a boot partition, startup data of boot storage device 191 may be replaced with the backup startup data, and data processing system 100A may be rebooted using the backup startup data on boot storage device 191. For example, to obtain the backup startup data, management controller 152 may transmit a request (e.g., a read request) to the boot partition of storage device 192 via a side band channel to receive the backup startup data, receive a copy of the requested backup startup data, verify an integrity of the copy of the backup startup data, and/or perform any other actions.

Management controller 152 may subsequently transmit the copy of the backup startup data to boot storage device 191 along with instructions via a second side band channel to replace the startup data of boot storage device 191. To do so, the existing startup data stored on boot storage device 191 may be removed (e.g., deleted from the non-volatile memory), the copy of backup startup data may be written to memory of boot storage device 191, boot storage device 191 be flashed using the copy of backup startup data, and/or any other actions may be performed. Data processing system 100A may attempt to be rebooted using the copy of backup data hosted on boot storage device 191. The rebooting may be initiated by management controller 152, as a result of a configuration (e.g., based on an update to storage resources hosted by boot storage device 191), and/or via any other mechanisms. Processor 190 may retrieve the startup data from boot storage device 191, execute instructions (e.g., firmware code) based on the startup data, initialize hardware resources, and provide control to a management entity (e.g., an operating system)

While startup data recovery process 214 is performed, management controller 152 may obtain updated status data and provide the updated status data to visual display system 194 at interaction 216 (e.g., similarly to interaction 210). The updated status data may include, for example, different predefined messages that may be mapped to actions performed during startup data recovery process 214. The different predefined messages may include, for example, "System is recovering", "Recovery complete", "System is restarting", etc.). By being informed of the status, the user may be more likely to perform actions (e.g., waiting, providing input, contacting support, etc.) to place data processing system 100A in the desired operating state.

For example, consider a scenario in which management controller is unable to obtain the copy of backup startup data during startup data recovery process 214. A message corresponding to the failure to obtain the copy of backup startup data may be displayed to inform the user to contact technical support, provide an alternate data source (e.g., external storage device), and/or perform any other actions.

Thus, using processes and interactions shown in FIG. 2B, visual feedback may be provided to a user of data processing system while a startup data recovery process is performed. Because in-band components of the data processing system may be unable to inform the user during the startup, a management controller may initiate operation of a visual display system of the data processing system to provide the visual feedback. By doing so, the data processing system may be more likely to be placed in a desired operating state as a result of the user being informed of the operational state of the data processing system.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
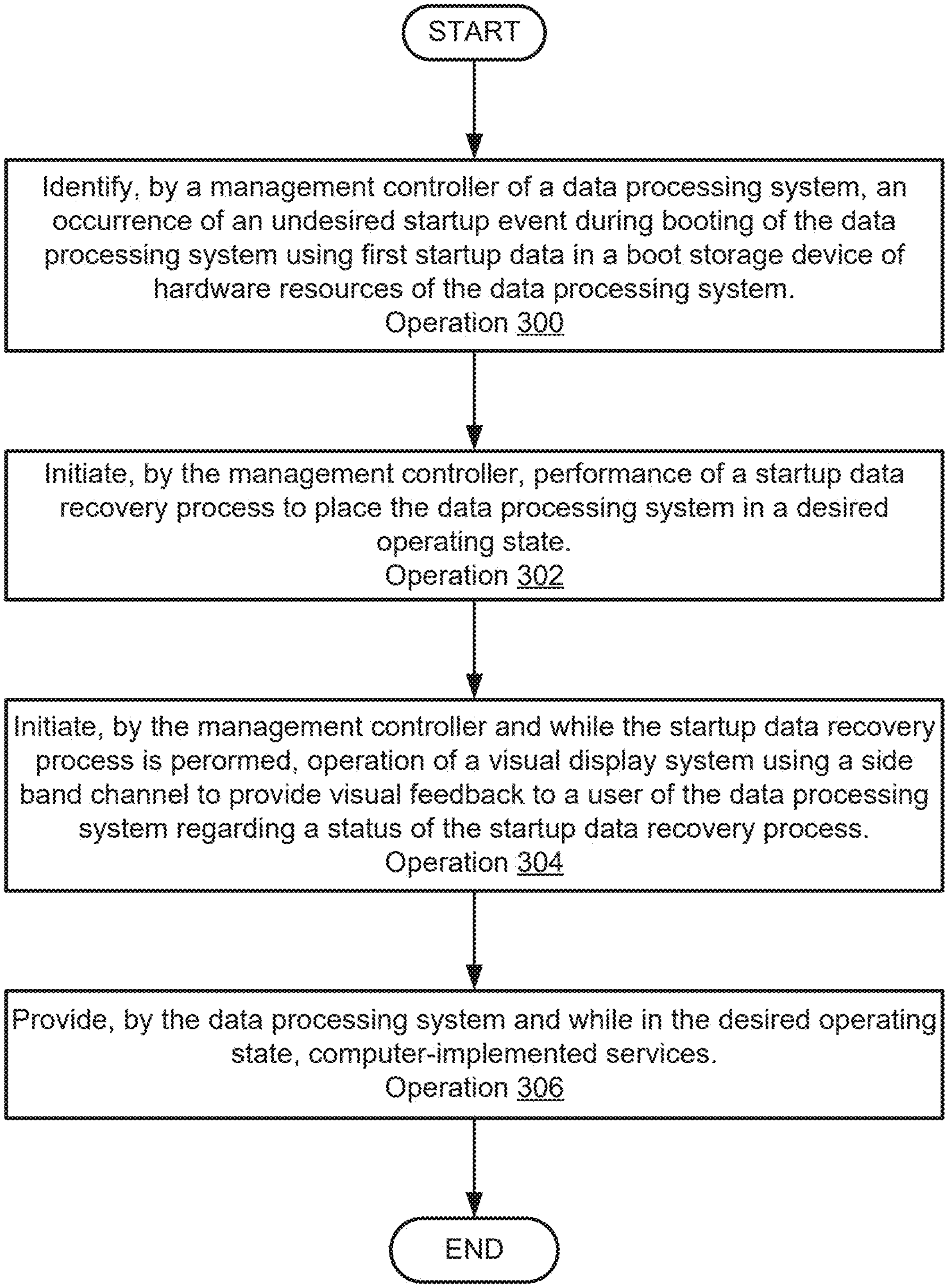
FIGS. 3A-3B show flow diagrams illustrating methods in accordance with an embodiment.
Figure 3B:
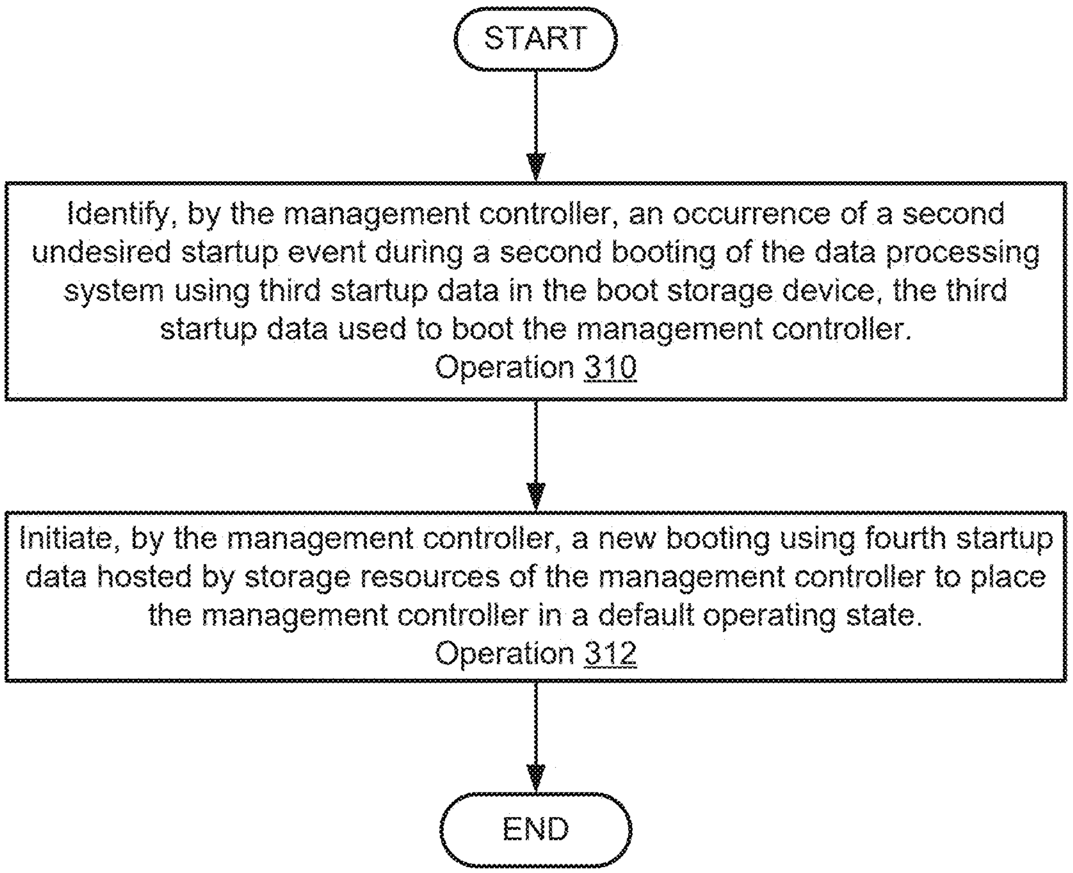

As discussed above, the components of FIGS. 1A-1C may perform various methods to manage a data processing system. FIGS. 3A-3B illustrate methods that may be performed by the components of the system of FIGS. 1A-1C. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing operation of a data processing system in accordance with an embodiment is shown. The method may be performed, for example, by any of the components of the system of FIGS. 1A-1C, and/or other components not shown therein.

At operation 300, an occurrence of an undesired startup event during booting of the data processing system using first startup data in a boot storage device of hardware resources of the data processing system may be identified. Because in-band channels may have limited functionality during the booting and/or as a result of the undesired boot event, the management controller may obtain information (e.g., telemetry data, results of processes performed, etc.) regarding the booting from a processor of the data processing system using a side band channel. For example, the management controller may detect that a system hang (e.g., a boot timeout) based on the information, and infer that the startup data in the boot storage device is to be replaced. To provide its functionality, the management controller may be booted and/or otherwise placed in a desired operating state. In an instance where the management controller is not in the desired operating state, the management controller may perform a new booting using startup data stored on storage resources of the management controller. Refer to FIG. 3B for additional details regarding the new booting for the management controller.

At operation 302, performance of a startup data recovery process may be initiated by the management controller to place the data processing system in a desired operating state. Based on the occurrence of the undesired startup event, the performance of the startup data recovery process may be initiated by: (i) transmitting a read request (e.g., an identifier, file address, etc.) to a storage device for second startup data (e.g., a copy of backup startup data), (ii) receiving the second startup data via a second side band channel and/or using a data transfer protocol (e.g., NVMe), (iii) overwriting the first startup data on the boot storage device with the second startup data using a third side band channel, and/or via any other processes.

At operation 304, operation of a visual display system may be initiated by the management controller to provide visual feedback to a user of the data processing system. The operation of the visual display system may be initiated by: (i) obtaining a set of predefined messages stored on storage resources of the management controller and/or the storage device, (ii) processing, by the management controller, the set of predefined messages, (iii) powering on a visual display system (e.g., a display panel, drivers, controllers, etc.), (iv) transmitting signals to a controller (e.g., a timing controller)

of the visual display system, (v) activating the display panel based on the signals to provide the visual feedback to the user, and/or via any other processes.

The visual feedback may be provided to the user while the startup data recovery process is performed. For example, actions described operation 302 and operation 304 may occur concurrently, based on progress of the startup data recovery process. The visual feedback (e.g., a portion of the predefined messages) may, for example, be mapped to corresponding steps of the startup data recovery process to inform the user of a status of the startup data recovery process, an operational state of the data processing system, and/or user action to be performed to place the data processing system in a desired operating state.

At operation 306, computer-implemented services may be provided by the data processing system and while in the desired operating state. The computer-implemented services may be provided by: (i) installing a new management entity (e.g., an application, driver, firmware etc.), (ii) providing an interface for a user of the data processing system, and/or via any other processes.

The method may end following operation 306.

Using the method shown in FIG. 3A, operation of a data processing system may be managed using a management controller to provide visual feedback to a user regarding a status of a startup data recovery process performed based on an occurrence of an undesired startup event. By doing so, the user may be directed to perform user actions to improve a likelihood of placing the data processing system in a desired operating state.

Turning to FIG. 3B, a second flow diagram illustrating a method of managing operation of a management controller of a data processing system in accordance with an embodiment is shown. The method may be performed, for example, by any of the components of the system of FIGS. 1A-1C, and/or other components not shown therein.

At operation 310, an occurrence of a second undesired startup event may be identified by the management controller during a second booting using third startup data of the boot storage device. The management controller may identify the occurrence of the second undesired startup event based on a failure to retrieve the third startup data (e.g., firmware image for the management controller), inability to communicate with the boot storage device, and/or any other conditions.

At operation 312, a new booting may be initiated by the management controller using fourth startup data (e.g., an OEM bootloader) hosted by storage resources of the management controller. The new booting may be initiated by: (i) triggering a reset vector for the management controller when the second undesired startup event is identified, (ii) modifying a control and/or data path for a copy of startup data during the new booting, (iii) attempting to load the fourth startup data into memory of the management controller, and/or via any other processes.

The method may end following operation 312.

Using the method shown in FIG. 3B, the management controller may be placed in a default operating state (e.g., a diagnostic operating state) used to diagnose operation of hardware resources during identifying of the occurrence of the first undesired startup event (e.g., discussed in FIG. 3A). By doing so, the management controller may provide management functionalities usable to place the data processing system in a desired operating state.

Figure 4:
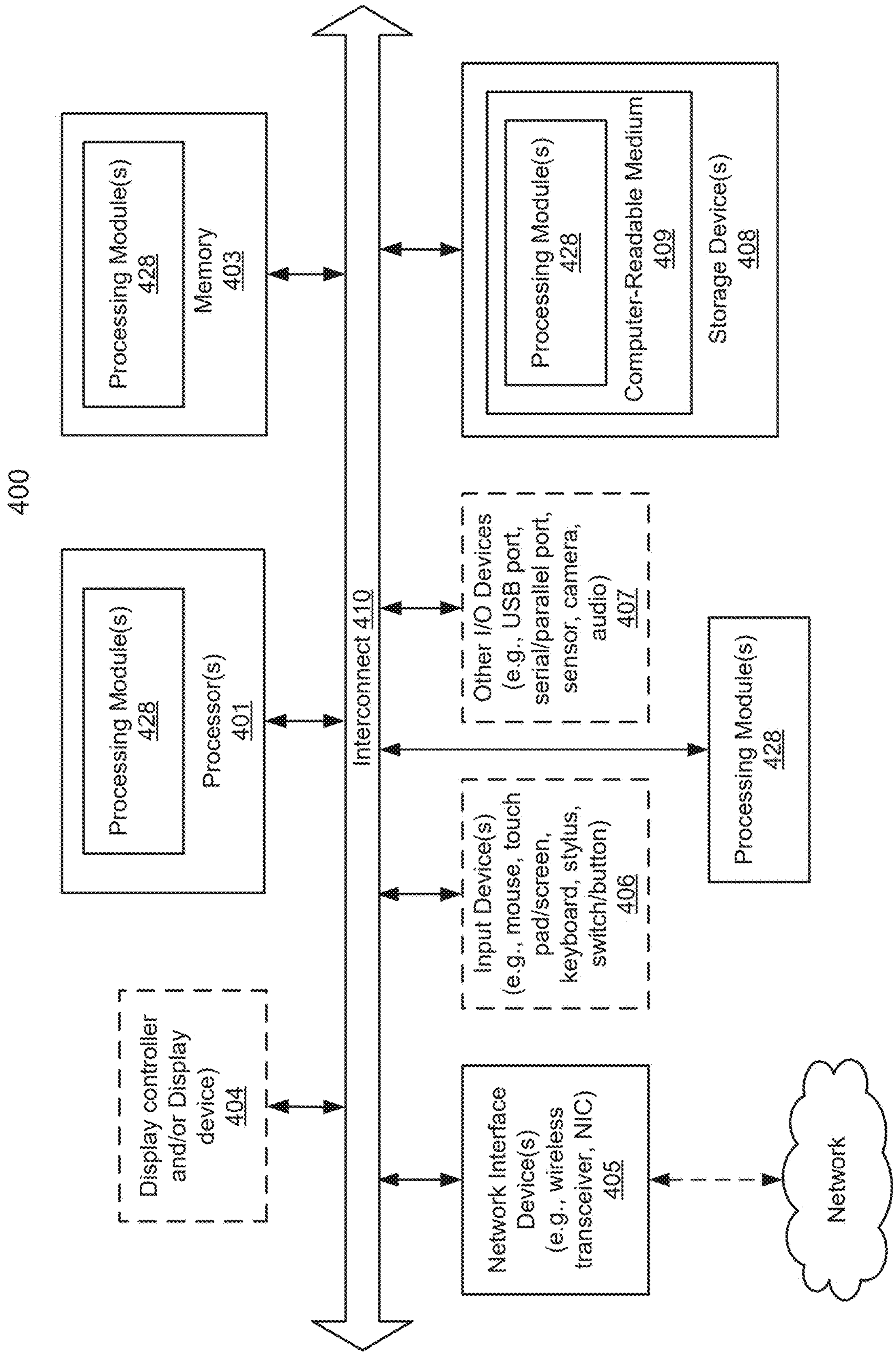
FIG. 4 shows a block diagram illustrating a data processing system in accordance with an embodiment.

Any of the components illustrated in FIGS. 1A-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term “machine” or “system” shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing operation of a data processing system, the method comprising:
- identifying, by a management controller of the data processing system, an occurrence of an undesired startup event during a booting of the data processing system using first startup data in a boot storage device of hardware resources of the data processing system;
- based on the identifying:
  - initiating, by the management controller, performance of a startup data recovery process to place the data processing system in a desired operating state;
  - while the startup data recovery process is performed:
    - initiating, by the management controller, operation of a visual display system using a side band channel to provide visual feedback to a user of the data processing system regarding a status of the startup data recovery process; and
  - providing, by the data processing system and while in the desired operating state, computer-implemented services.

2. The method of claim 1, further comprising:
- prior to identifying the occurrence of the undesired startup event:
  - identifying, by the management controller, an occurrence of a second undesired startup event during a second booting of the data processing system using third startup data in the boot storage device, the third startup data used to boot the management controller; and
  - based on the identifying:
    - initiating, by the management controller, a new booting using fourth startup data hosted by storage resources of the management controller to place the management controller in a default operating state.

3. The method of claim 2, wherein the default operating state is a diagnostic state used in diagnosing operation of hardware components of the hardware resources during identifying of the occurrence of the undesired startup event.

4. The method of claim 1, wherein identifying the occurrence of the undesired startup event comprises:
- obtaining, by the management controller and via a second side band channel, information from a processor of the hardware resources while the processor attempts to boot the data processing system, the information indicating that the undesired startup event has occurred.

5. The method of claim 1, wherein performing the startup data recovery process comprises:
- obtaining, by the management controller and via a second side band channel, second startup data from a boot partition of a storage device hosted by the hardware resources;
- replacing, by the management controller and via a third side band channel, the first startup data with the second startup data; and
- initiating, by the management controller, a rebooting process by a processor of the hardware resources using the second startup data hosted by the boot storage device.

6. The method of claim 1, wherein the visual display system is unusable by a processor of the hardware resources until completion of the booting.

7. The method of claim 1, wherein the visual display system comprises:
- a timing controller; and
- a display panel.

8. The method of claim 1, wherein the visual feedback comprises predefined messages adapted to direct user action to facilitate placing the data processing system in the desired operating state.

9. The method of claim 8, wherein the predefined messages are:
- stored on a boot partition of a storage device hosted by the hardware resources, and
  - obtained, by the management controller, from the boot partition using a second side band channel.

10. The method of claim 8, wherein the predefined messages are stored on storage resources of the management controller.

11. The method of claim 1, wherein the visual feedback informs the user regarding changes in an operational state of the data processing system while in-band components of the data processing system are unable to inform the user due, at least in part, to inaccessibility of the first startup data.

12. The method of claim 1, wherein the management controller operates independently from and is distinct from the hardware resources.

13. The method of claim 12, wherein the management controller is on a separate power domain from the hardware resources so that the management controller is operable while the hardware resources are inoperable.

14. A non-transitory machine-readable medium having instructions stored therein, which when executed by a processor, cause the processor to perform operations for managing operation of a data processing system, the operations comprising:

identifying, by a management controller of the data processing system, an occurrence of an undesired startup event during a booting of the data processing system using first startup data in a boot storage device of hardware resources of the data processing system;

based on the identifying:

initiating, by the management controller, performance of a startup data recovery process to place the data processing system in a desired operating state;

while the startup data recovery process is performed:

initiating, by the management controller, operation of a visual display system using a side band channel to provide visual feedback to a user of the data processing system regarding a status of the startup data recovery process; and providing, by the data processing system and while in the desired operating state, computer-implemented services.

15. The non-transitory machine-readable medium of claim 14, wherein the operations further comprise:

prior to identifying the occurrence of the undesired startup event:

identifying, by the management controller, an occurrence of a second undesired startup event during a second booting of the data processing system using third startup data in the boot storage device, the third startup data used to boot the management controller; and based on the identifying:

initiating, by the management controller, a new booting using fourth startup data hosted by storage resources of the management controller to place the management controller in a default operating state.

16. The non-transitory machine-readable medium of claim 15, wherein is a diagnostic state used in diagnosing operation of hardware components of the hardware resources during identifying of the occurrence of the undesired startup event.

17. The non-transitory machine-readable medium of claim 14, wherein the visual feedback informs the user regarding changes in an operational state of the data processing system while in-band components of the data processing system are unable to inform the user due, at least in part, to inaccessibility of the first startup data.

18. A system, comprising:

a processor; and a memory coupled to the processor to store instructions, which when executed by the processor, cause the processor to perform operations for managing operation of a data processing system, the operations comprising:

identifying, by a management controller of the data processing system, an occurrence of an undesired startup event during a booting of the data processing system using first startup data in a boot storage device of hardware resources of the data processing system;

based on the identifying:

initiating, by the management controller, performance of a startup data recovery process to place the data processing system in a desired operating state;

while the startup data recovery process is performed:

initiating, by the management controller, operation of a visual display system using a side band channel to provide visual feedback to a user of the data processing system regarding a status of the startup data recovery process; and providing, by the data processing system and while in the desired operating state, computer-implemented services.

19. The system of claim 18, wherein the operations further comprise:

prior to identifying the occurrence of the undesired startup event:

identifying, by the management controller, an occurrence of a second undesired startup event during a second booting of the data processing system using third startup data in the boot storage device, the third startup data used to boot the management controller; and based on the identifying:

initiating, by the management controller, a new booting using fourth startup data hosted by storage resources of the management controller to place the management controller in a default operating state.

20. The system of claim 19, wherein the default operating state is a diagnostic state used in diagnosing operation of hardware components of the hardware resources during identifying of the occurrence of the undesired startup event.

* * * * *